(12) United States Patent
Gunji et al.

(10) Patent No.: US 11,365,764 B2
(45) Date of Patent: Jun. 21, 2022

(54) ROLLING BEARING UNIT

(71) Applicant: NSK LTD., Tokyo (JP)

(72) Inventors: Daisuke Gunji, Kanagawa (JP); Hiroyasu Kumagai, Kanagawa (JP); Naohiro Hitomi, Kanagawa (JP); Ricardo Rodriguez Lopez, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/262,911

(22) PCT Filed: Jul. 22, 2019

(86) PCT No.: PCT/JP2019/028655
§ 371 (c)(1),
(2) Date: Jan. 25, 2021

(87) PCT Pub. No.: WO2020/022267
PCT Pub. Date: Jan. 30, 2020

(65) Prior Publication Data
US 2021/0254661 A1 Aug. 19, 2021

(30) Foreign Application Priority Data
Jul. 26, 2018 (JP) .............................. JP2018-140216

(51) Int. Cl.
F16C 41/00 (2006.01)
B60B 27/00 (2006.01)
F16C 33/72 (2006.01)

(52) U.S. Cl.
CPC .......... F16C 41/00 (2013.01); B60B 27/0047 (2013.01); B60B 27/0073 (2013.01);
(Continued)

(58) Field of Classification Search
CPC ...... F16C 33/723; F16C 41/00; F16C 41/004; F16C 41/007; F16C 2326/02;
(Continued)

(56) References Cited

U.S. PATENT DOCUMENTS

2009/0243600 A1* 10/2009 Itomi ..................... G01P 3/487
324/207.25
2010/0001720 A1* 1/2010 Mizutani ............... F16C 33/723
324/207.25
(Continued)

FOREIGN PATENT DOCUMENTS

JP 2003-278779 A 10/2003
JP 2014-023298 A 2/2014
(Continued)

OTHER PUBLICATIONS

International Search Report of PCT/JP2019/028655 dated Sep. 10, 2019 [PCT/ISA/210].
(Continued)

Primary Examiner — Alan B Waits
(74) Attorney, Agent, or Firm — Sughrue Mion, PLLC

(57) ABSTRACT

A rolling bearing unit includes: an inner ring member having a recess on a first side in an axial direction along a rotation axis, which is recessed toward a second side in the axial direction; an outer ring member on an outer peripheral side of the inner ring member; a rolling body between the inner ring member and the outer ring member; a non-contact transmitter using electric field coupling capable of transmitting at least one of an electric power or a signal and including a stationary-side transmission part including a stationary-side electrode and a rotary-side transmission part including a rotary-side electrode facing the stationary-side electrode; and a covering member supported by the first side of the outer ring member in the axial direction, covering the first side of the inner ring member in the axial direction, and fixing the stationary-side transmission part to the first side in the axial direction.

3 Claims, 4 Drawing Sheets

(52) U.S. Cl.
CPC .......... *F16C 41/004* (2013.01); *F16C 33/723* (2013.01); *F16C 2326/02* (2013.01)

(58) Field of Classification Search
CPC ............ B60B 27/0047; B60B 27/0068; B60B 27/0073; B60B 35/121; B60B 2900/321; B60B 2900/931; H02J 50/05
See application file for complete search history.

(56) References Cited

U.S. PATENT DOCUMENTS

| | | | |
|---|---|---|---|
| 2015/0137803 A1* | 5/2015 | Lee | G01D 5/12 324/207.25 |
| 2018/0297399 A1 | 10/2018 | Matsuda et al. | |
| 2018/0361789 A1 | 12/2018 | Gunji et al. | |
| 2021/0221172 A1* | 7/2021 | Jeon | B60B 27/0068 |

FOREIGN PATENT DOCUMENTS

| | | |
|---|---|---|
| JP | 2018-001769 A | 1/2018 |
| WO | 2008/014766 A1 | 2/2008 |
| WO | 2017/051881 A1 | 3/2017 |
| WO | 2017/094420 A1 | 6/2017 |

OTHER PUBLICATIONS

Communication dated Apr. 22, 2022, issued by the European Patent Office in counterpart European Application No. 19840013.7.

* cited by examiner

OUT ← → IN

ROLLING BEARING UNIT

CROSS-REFERENCE TO RELATED APPLICATION

This application is a National Stage of PCT international application Ser. No. PCT/JP2019/028655 filed on Jul. 22, 2019 which designates the United States, incorporated herein by reference, and which is based upon and claims the benefit of priority from Japanese Patent Application No. 2018-140216 filed on Jul. 26, 2018, the entire contents of which are incorporated herein by reference.

FIELD

The present disclosure relates to a rolling bearing unit for supporting wheels.

BACKGROUND

Conventionally, wheels of a vehicle are each supported by a suspension through a rolling bearing unit. A structure in which a non-contact power feeding device is provided in the rolling bearing unit has been known. (see Patent Literature 1).

In the rolling bearing unit disclosed in Patent Literature 1, a covering member is provided on the inner side of an outer ring on a stationary-side in a vehicle width direction to cover the inner side of an inner ring on a rotary-side in the vehicle width direction. Further, the non-contact power feeding device is a magnetic field resonance coupling type power feeding device, and includes a power feeding coil disposed on the inner side of the covering member in the vehicle width direction and a power receiving coil disposed on the outer side of the covering member in the vehicle width direction.

CITATION LIST

Patent Literature

Patent Literature 1: Japanese Patent Application Laid-Open Publication No. 2018-1769

Technical Problem

As described above, the non-contact power feeding device in Patent Literature 1 is of the magnetic field resonance coupling type, and has a problem of increase in size because a coil is required for each of the power feeding side and the power receiving side. Further, since the power feeding coil and the power receiving coil are disposed to face each other with the covering member therebetween, there is a problem that a distance between the power feeding side and the power receiving side is increased and a transmission efficiency is lowered.

For the foregoing reasons, there is a need for a rolling bearing unit for supporting wheels including a non-contact power feeding device that is compact, has high mountability, and has high transmission efficiency.

SUMMARY

A rolling bearing unit according to a first aspect of the present invention, includes: an inner ring member having a recess on a first side in an axial direction along a rotation axis, the recess being recessed toward a second side in the axial direction; an outer ring member disposed on an outer peripheral side of the inner ring member; a rolling body that is rollably provided between the inner ring member and the outer ring member and rotatably supports the inner ring member relative to the outer ring member; a non-contact transmitter using electric field coupling that is capable of transmitting at least one of an electric power or a signal and includes a stationary-side transmission part including a stationary-side electrode and a rotary-side transmission part including a rotary-side electrode disposed to face the stationary-side electrode at an axial distance therefrom; and a covering member that is supported by the first side of the outer ring member in the axial direction, covers the first side of the inner ring member in the axial direction, and fixes the stationary-side transmission part to the first side in the axial direction.

According to the first aspect of the present invention, the entire non-contact transmitter using electric field coupling is disposed on the second side of the covering member in the axial direction. Therefore, as compared with the non-contact power feeding device of the magnetic field resonance coupling type in which the power feeding coil and the power receiving coil face each other with the covering member therebetween as in the conventional art, the aspect of the present invention has an advantage that a higher transmission efficiency can be easily obtained since the distance between the power feeding side and the power receiving side is shorter.

In a rolling bearing unit according to a second aspect of the present invention, the rotary-side transmission part and the stationary-side transmission part are housed inside the recess.

According to the second aspect of the present invention, a protrusion length of the transmitter protruding to a first side in the axial direction can be reduced. Therefore, an increase in the size of the entire rolling bearing unit can be hampered.

In a rolling bearing unit according to a third aspect of the present invention, the rotary-side transmission part is housed inside the recess, the inner ring member has a partition wall extending inward in a radial direction to serve as a bottom of the recess and provided with a through hole that penetrates in the axial direction, and the rotary-side transmission part abuts against the partition wall to seal the through hole.

According to the third aspect of the present invention, the rotary-side transmission part abuts against the partition wall to seal the through hole. Therefore, water can be hindered from entering the recess from the through hole with a simple structure.

In a rolling bearing unit according to a fourth aspect of the present invention, the stationary-side transmission part is an integrally molded product with the covering member.

According to the fourth aspect of the present invention, the stationary-side transmission part including the stationary-side electrode is integrally provided with the covering member, whereby water can be hindered from entering the stationary-side electrode. Further, the number of parts of the covering member can be reduced.

Advantageous Effects of Invention

According to the rolling bearing unit of an aspect of the present invention, the transmission efficiency of the non-contact power feeding device is improved as compared with the conventional art.

DESCRIPTION OF EMBODIMENTS

Hereinafter, embodiments according to the present invention will be described with reference to the drawings, but the present invention is not limited to the embodiments. The requirements of each embodiment to be described below can be combined as appropriate. In addition, some components may not be used. In the following description, a rotation axis of an inner ring member is referred to as AX, a direction along the rotation axis AX is referred to as an "axial direction" or a "left-right direction", and a direction orthogonal to the rotation axis AX is referred to as a "radial direction". Furthermore, a "first side in the axial direction" is referred to as an "inner side (IN side) in a vehicle width direction", and a "second side in the axial direction" is referred to as an "outer side (OUT side) in the vehicle width direction". Further, a front side of a vehicle is referred to as an FR side, and a rear side is referred to as an RR side.

Figure 1:
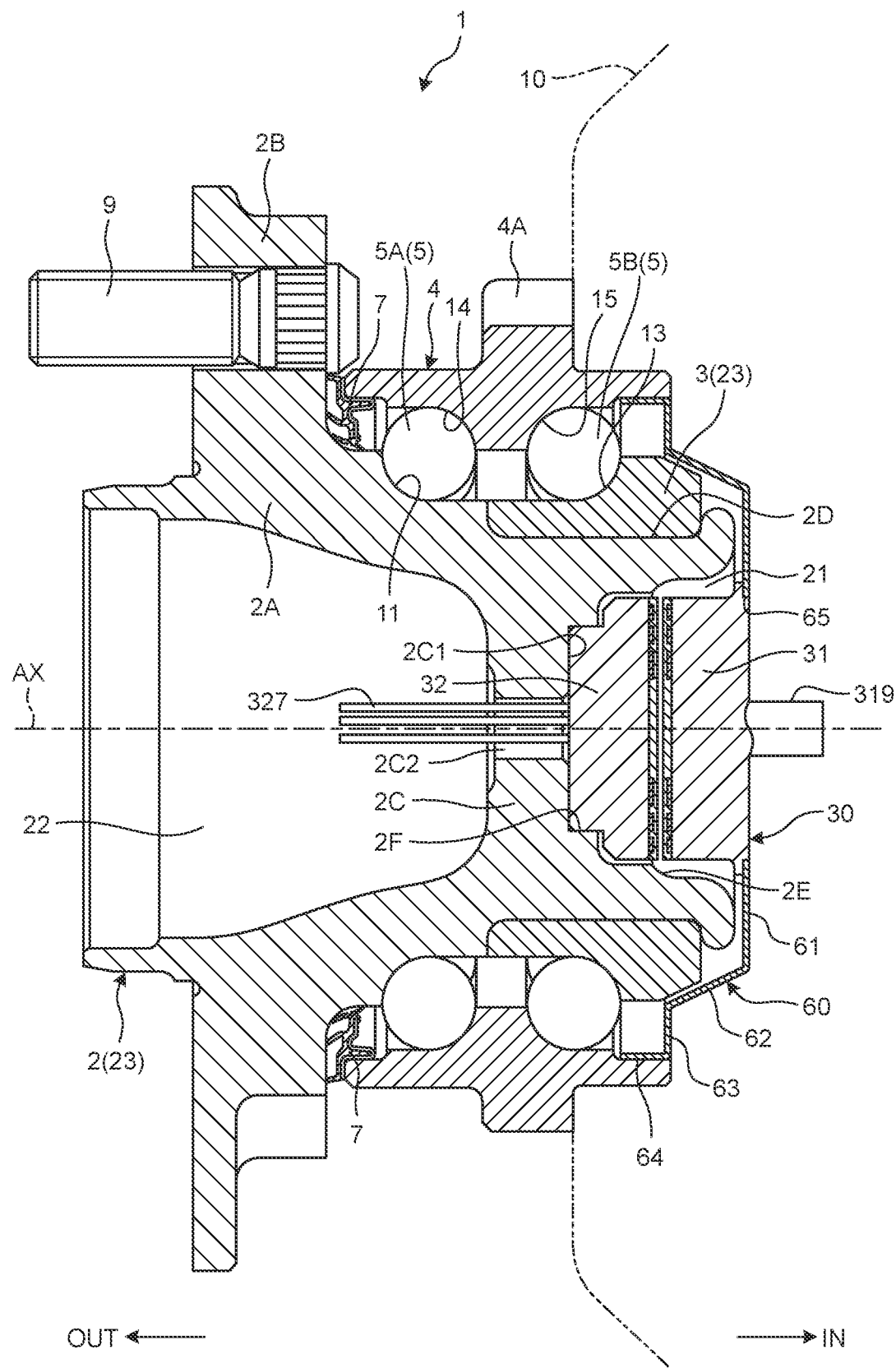
FIG. 1 is a cross-sectional view illustrating a rolling bearing unit according to an embodiment.

FIG. 1 is a cross-sectional view illustrating an example of a rolling bearing unit (hub bearing) 1 according to an embodiment.

As illustrated in FIG. 1, the rolling bearing unit 1 is supported by a suspension 10 of a vehicle while rotatably supporting a wheel of the vehicle. That is, the wheel of the vehicle is supported by the suspension 10 through the rolling bearing unit 1.

The rolling bearing unit 1 includes an inner ring member 23, an outer ring member 4 (outer ring), rolling bodies 5, a transmitter 30, and a first cover 60 (covering member). The inner ring member 23 is rotatable about the rotation axis AX. The outer ring member 4 (outer ring) has a cylindrical shape, is disposed on a radial outer side (outer peripheral side) of the inner ring member 23, and is supported in a stationary state.

The rolling bodies 5 are disposed between the inner ring member 23 and the outer ring member 4. The transmitter 30 is a non-contact transmitter using electric field coupling, and includes a stationary-side transmission part 31 and a rotary-side transmission part 32. The first cover 60 (covering member) is supported by the outer ring member 4 and covers the inner side of the inner ring member 23 in the vehicle width direction. Further, a seal member 7 is provided to close a gap between the inner ring member 23 and the outer ring member 4.

The inner ring member 23 includes a hub 2 and an inner ring 3. The hub 2 has a cylindrical hub main body 2A extending in the axial direction, a flange portion 2B extending toward the outer side in the radial direction from an outer peripheral surface of the hub main body 2A, and a partition wall 2C extending inward in the radial direction from an inner peripheral surface at a center of the hub main body 2A in the vehicle width direction. A groove portion 2D recessed inward in the radial direction is provided on an outer peripheral portion of the hub main body 2A on the inner side in the vehicle width direction. The annular inner ring 3 is fitted into the groove portion 2D, and the hub 2 and the inner ring 3 rotate about the rotation axis AX integrally. A wheel (not illustrated) is fixed to the flange portion 2B through a hub bolt 9.

Further, the hub 2 is provided with two recesses extending along the vehicle width direction. Specifically, the hub 2 is provided with a first recess 21 (recess) that is open toward the inner side in the vehicle width direction and extends toward the outer side in the vehicle width direction, and a second recess 22 that is open toward the outer side in the vehicle width direction and extends inward in the vehicle width direction. The first recess 21 and the second recess 22 are adjacent to each other in the axial direction with the partition wall 2C therebetween. That is, an edge of the first recess 21 has an inner peripheral surface 2E on the inner side of the hub 2 in the vehicle width direction, a step 2F, and a side surface 2C1 of the partition wall 2C on the inner side in the vehicle width direction. A through hole 2C2 penetrates the partition wall 2C in the axial direction. As described above, the partition wall 2C extends inward in the radial direction and serves as a bottom of the first recess 21.

The outer ring member 4 (outer ring) is non-rotatable and is disposed on the outer side (outer peripheral side), in the radial direction, of the hub 2 and the inner ring 3. The outer ring member 4 has a flange portion 4A, and the flange portion 4A is coupled to the suspension 10.

The rolling bodies 5 are disposed between the inner ring member 23 and the outer ring member 4. The rolling bodies 5 include a plurality of rolling bodies 5A disposed between the hub main body 2A and the outer ring member 4, and a plurality of rolling bodies 5B disposed between the inner ring 3 and the outer ring member 4.

In the present embodiment, the rolling bodies 5 are spheres, but may be rollers (tapered rollers). For example, when the rolling bearing unit 1 is applied to a heavy vehicle, the tapered rollers may be used as the rolling bodies 5. In this way, the rolling bodies 5 are rollably provided between the inner ring member 23 and the outer ring member 4, and rotatably supports the inner ring member 23 relative to the outer ring member 4.

An outer peripheral surface of the inner ring member 23 is provided with a first inner race 11 on which parts of outer surfaces of the rolling bodies 5A are located and a second inner race 13 on which parts of outer surfaces of the rolling bodies 5B are located. An inner peripheral surface of the outer ring member 4 is provided with a first outer race 14 on which parts of the outer surfaces of the rolling bodies 5A are located and a second outer race 15 on which parts of the outer surfaces of the rolling bodies 5B are located. The rolling bodies 5A are disposed between the first inner race 11 and the first outer race 14, and the rolling bodies 5B are disposed between the second inner race 13 and the second outer race 15.

A gap extending in a circumferential direction is provided between an end of the outer ring member 4 on the outer side in the vehicle width direction and the outer peripheral surface of the hub main body 2A to separate therebetween in the axial direction and the radial direction. In the present embodiment, the gap is closed by provision of the seal member 7 at an end of the outer ring member 4 on the outer side in the axial direction.

The first cover 60 (covering member) has a first portion 61, a second portion 62, a third portion 63, and a fourth portion 64. The first portion 61 has a disk-like shape and is disposed on the inner side in the radial direction. From an outer end of the first portion in the radial direction toward the outer side in the radial direction, the second portion 62 is inclined to be directed toward the outer side in the vehicle width direction. The third portion 63 enlarges and extends toward the outer side in the radial direction from an outer end of the second portion 62 in the radial direction and has an annular shape. The fourth portion 64 extends from an outer end of the third portion 63 in the radial direction toward the outer side in the vehicle width direction.

A circular through hole 65 is provided in the center portion, in the radial direction, of the first portion 61. The first cover 60 is assembled to the outer ring member 4 by fitting the fourth portion 64 to an inner peripheral surface of the end of the outer ring member 4 on the inner side in the vehicle width direction. The first cover 60 is made of resin.

Figure 2:
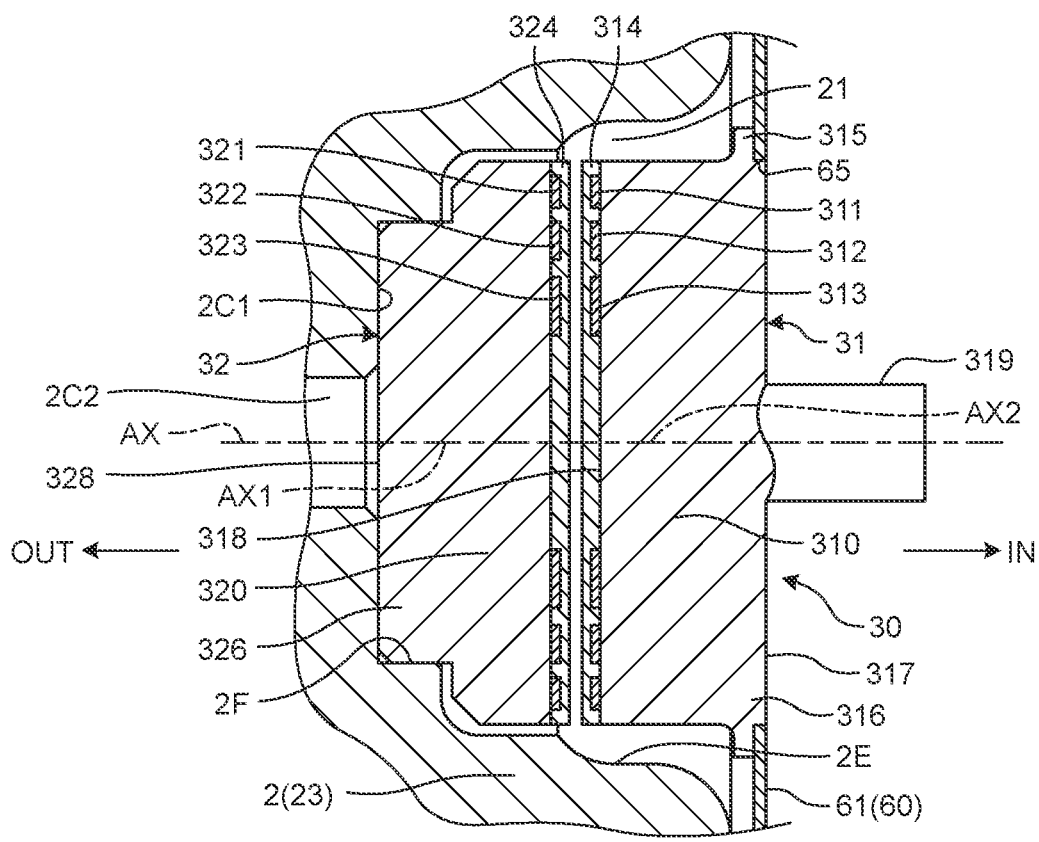
FIG. 2 is an enlarged cross-sectional view of a part of FIG. 1.
Figure 3:
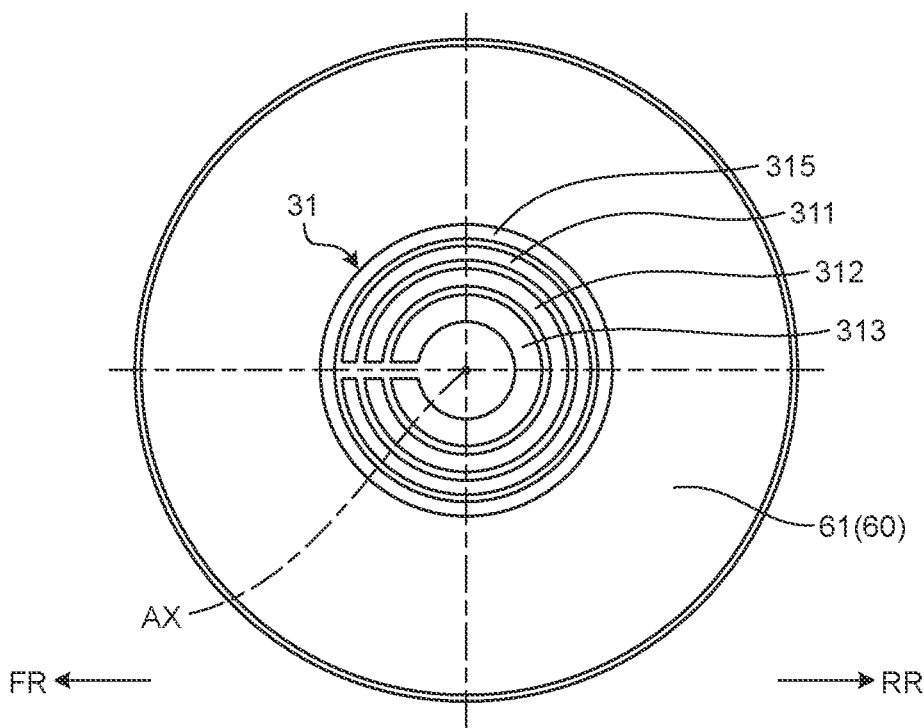
FIG. 3 is a side view of a first transmission part in FIG. 1 as viewed from an inner side in a vehicle width direction and in which a coating portion is not illustrated.

FIG. 2 is an enlarged cross-sectional view of a part of FIG. 1. FIG. 3 is a side view of the stationary-side transmission part 31 of FIG. 1 as viewed from the inner side in the vehicle width direction, and a covering portion 314 is not illustrated.

The transmitter 30 is a non-contact transmitter using electric field coupling, and as illustrated in FIG. 2, the transmitter 30 includes a stationary-side transmission part 31 and a rotary-side transmission part 32. In the transmitter 30, a signal indicative of a tire pressure or the like and electric power are transmitted between the stationary-side transmission part 31 and the rotary-side transmission part 32.

The transmitter 30 according to the embodiment has a function of transmitting both the electric power and the signal, but may have only a function of transmitting one of the electric power and the signal. The transmitter 30 is housed inside the first recess 21 (recess) of the hub 2 along the axial direction. Hereinafter, the transmitter 30 will be described in detail.

The stationary-side transmission part 31 is a transmission part on a stationary side, and is integrally joined (fixed) to the first cover 60. Therefore, the stationary-side transmission part 31 is supported by the outer ring member 4 through the first cover 60. The stationary-side transmission part 31 includes a stationary-side main body 310, the covering portion 314, a stationary-side first electrode 311 (stationary-side electrode), a stationary-side second electrode 312 (stationary-side electrode), and a stationary-side third electrode 313 (stationary-side electrode). The stationary-side main body 310 has a columnar shape and is made of resin. The covering portion 314 is joined to an outer end 318 of the stationary-side main body 310 in the vehicle width direction, and is made of resin. The stationary-side first electrode 311 (stationary-side electrode), the stationary-side second electrode 312 (stationary-side electrode), and the stationary-side third electrode 313 (stationary-side electrode) are embedded in the covering portion 314.

Further, the stationary-side main body 310 is provided with a flange portion 315 that extends toward the outer side in the radial direction and has an annular shape along a circumferential direction, and a fitting portion 316 is provided at a portion on the inner side of the flange portion 315 in the vehicle width direction. The fitting portion 316 is a portion of the stationary-side main body 310 between an inner end 317 in the vehicle width direction and an inner end of the flange portion 315 in the vehicle width direction. An outer peripheral surface of the fitting portion 316 is fitted and joined to an inner peripheral surface of the through hole 65 of the first cover 60.

Further, the flange portion 315 is joined to an end of the first portion 61 of the first cover 60 on the inner side in the radial direction. In the stationary-side main body 310, a connector 319 is integrally joined to the stationary-side main body 310 while extending toward the inner side in the vehicle width direction. As described above, the stationary-side transmission portion 31 is an integrally molded product in which the stationary-side main body 310 and the covering portion 314 are integrally joined to each other. Further, the stationary-side transmission part 31 and the first cover 60 are also integrally joined to each other as an integrally molded product.

As illustrated in FIG. 3, the stationary-side first electrode 311, the stationary-side second electrode 312, and the stationary-side third electrode 313 are formed concentrically around the rotation axis. Specifically, each electrode is substantially the same in area and is formed in a C shape in which a part of a circle is nicked.

As illustrated in FIG. 2, the rotary-side transmission part 32 is a transmission part on a rotary side and is integrally fixed to the hub 2. The rotary-side transmission part 32 includes a rotary-side main body 320, a covering portion 324, a rotary-side first electrode 321 (rotary-side electrode), a rotary-side second electrode 322 (rotary-side electrode), and a rotary-side third electrode 323 (rotary-side electrode). The rotary-side main body 320 has a cylindrical shape and is made of resin. The covering portion 324 is joined to the inner side of the rotary-side main body 320 in the vehicle width direction and is made of resin. The rotary-side first electrode 321 (rotary-side electrode), the rotary-side second electrode 322 (rotary-side electrode), and the rotary-side third electrode 323 (rotary-side electrode) are embedded inside the covering portion 324.

Further, a portion of the rotary-side main body 320 on the outer side in the vehicle width direction serves as a fitting portion 326. The fitting portion 326 is fitted to a step 2F which is a part of the edge of the first recess 21. In other words, the fitting portion 326 and the step 2F have an inlay structure. The rotary-side first electrode 321, the rotary-side second electrode 322, and the rotary-side third electrode 323 are formed so as to be substantially equal in shape and area to the stationary-side first electrode 311, the stationary-side second electrode 312, and the stationary-side third electrode 313 described with reference to FIG. 3, respectively, and are embedded inside the covering portion 324. An O-ring (not illustrated) may be disposed between the fitting portion 326 and the inlay portion of the step 2F to improve the sealing performance.

The first electrodes, the second electrodes, and the third electrodes are formed so as to be substantially equal in area to one another as described above so that capacitances between the first electrodes, the second electrodes, and the third electrodes can be set equally. When the covering portions 314 and 324 are made of a type of resin having a high dielectric constant, the capacitances can be set large.

Further, the stationary-side first electrode 311 and the rotary-side first electrode 321 are disposed to face each other, the stationary-side second electrode 312 and the rotary-side second electrode 322 are disposed to face each other, and the stationary-side third electrode 313 and the rotary-side third electrode 323 are disposed to face each other. An end face 328 of the rotary-side transmission part 32 on the outer side in the vehicle width direction abuts against a side surface 2C1 of the partition wall 2C to seal the through hole 2C2. As illustrated in FIG. 1, wiring 327 is connected to the rotary-side transmission part 32, and the wiring 327 is wired through the through hole 2C2. An O-ring (not illustrated) may be disposed between the end face 328 and the side surface 2C1, or a flexible material may be formed integrally with the end face 328 to improve the sealing performance.

Figure 4:
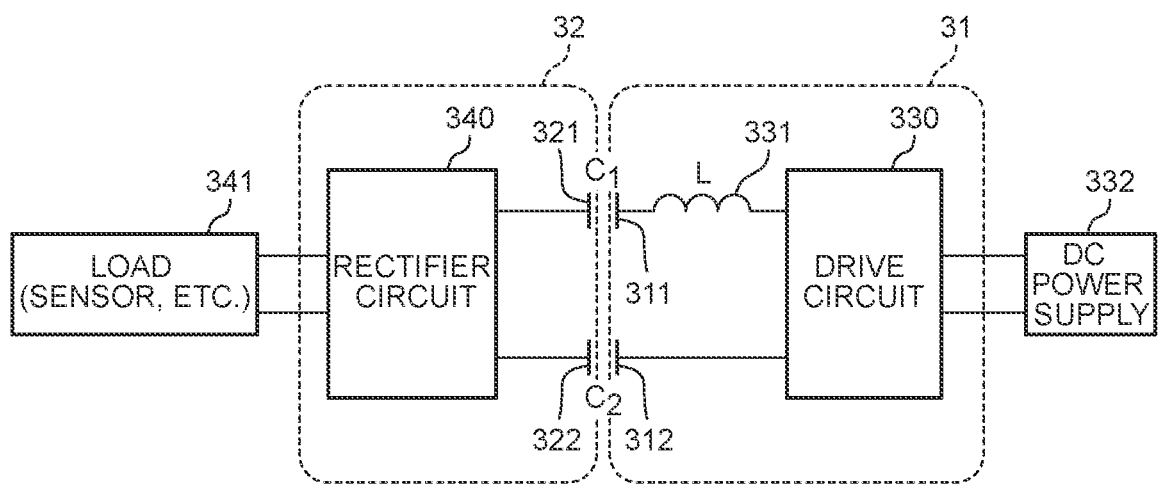
FIG. 4 is a diagram illustrating a circuit configuration according to the embodiment.

FIG. 4 is a diagram illustrating a circuit configuration of the transmitter according to the embodiment.

The stationary-side transmission part 31 on a fixed side provided on the first cover 60 includes a drive circuit 330 connected to a DC power supply 332 such as a battery and including a semiconductor switching element, an inductor 331 connected to the drive circuit 330, the stationary-side first electrode 311, and the stationary-side second electrode 312. The stationary-side third electrode 313 is omitted for convenience.

The rotary-side transmission part 32 provided in the hub 2 includes a load 341 such as a sensor provided on a tire or a wheel, a rectifier circuit 340 connected to the load 341, and the rotary-side first electrode 321 and the rotary-side second electrode 322, which are connected to the rectifier circuit 340. The rotary-side third electrode 323 is omitted for convenience. The stationary-side first electrode 311 and the rotary-side first electrode 321 are disposed to be separated from each other in the axial direction and face each other to form a capacitor C1.

Further, the stationary-side second electrode 312 and the rotary-side second electrode 322 are disposed to be separated from each other in the axial direction and face each other to form a capacitor C2. The capacitor C1 and an inductor 331 are connected in series to form an LC series resonant circuit. The drive circuit 330 is driven at a resonance frequency, whereby the stationary-side transmission part 31 can transmit an electric power to the rotary-side transmission part 32 on the rotary-side with high efficiency. The rotary-side transmission part 32 can rectify a high frequency current to supply a DC current to the load 341.

Although a configuration of transmitting the electric power has been described with reference to FIG. 4, a circuit can be provided for performing an information communication (signal transmission) with an increase in the number of electrodes. When the information communication is performed, the circuit can be operated at a high frequency and the high frequency can be modulated for performing a communication. For example, a modulation method such as amplitude shift modulation can be used.

As described above, according to the present embodiment, the entire non-contact transmitter 30 using electric field coupling is disposed on the outer side of the first cover 60 (covering member) in the vehicle width direction (the second side in the axial direction). Therefore, as compared with the non-contact power feeding device of the magnetic field resonance coupling type in which the power feeding coil and the power receiving coil are disposed to face each other with the covering member therebetween in the conventional art, the present embodiment has an advantage that a high transmission efficiency can be easily obtained since the distance between the power feeding side and the power receiving side is short.

Further, since the first cover 60 is not provided between a pair of electrodes included in the transmitter using electric field coupling, the distance between the pair of electrodes can be reduced as much as the thickness of the first cover 60, thereby improving the transmission efficiency. In the present invention, the transmitter 30 including the pair of electrodes can be disposed inside the first cover 60. Therefore, the structure of the present invention is further simplified as compared with the power feeding device in which the power feeding coil and the power receiving coil are respectively disposed inside and outside the covering member as in the conventional non-contact power feeding device.

Further, the rotary-side transmission part 32 and the stationary-side transmission part 31 are housed inside the first recess 21 (recess). Therefore, a protrusion length of the transmitter 30 protruding toward the inner side in the vehicle width direction (first side in the axial direction) can be set small. Therefore, the increase in size of the entire rolling bearing unit 1 can be hampered.

Further, according to the present embodiment, the rotary-side transmission part 32 abuts against the partition wall 2C, whereby the through hole 252 is sealed. Consequently, water can be hindered from entering the inside of the first recess 21 (recess) from the through hole 2C2 with a simple structure.

Further, according to the present embodiment, the stationary-side transmission part 31 including the stationary-side first electrode 311, the stationary-side second electrode 312, and the stationary-side third electrode 313 (stationary-side electrodes) is integrally provided with the first cover 60 (covering member), whereby water can be hindered from entering the stationary-side electrodes. Further, the number of parts of the first cover 60 can be reduced.

Although the embodiment has been described above, the embodiment is not limited by the details described above.

Figure 5:
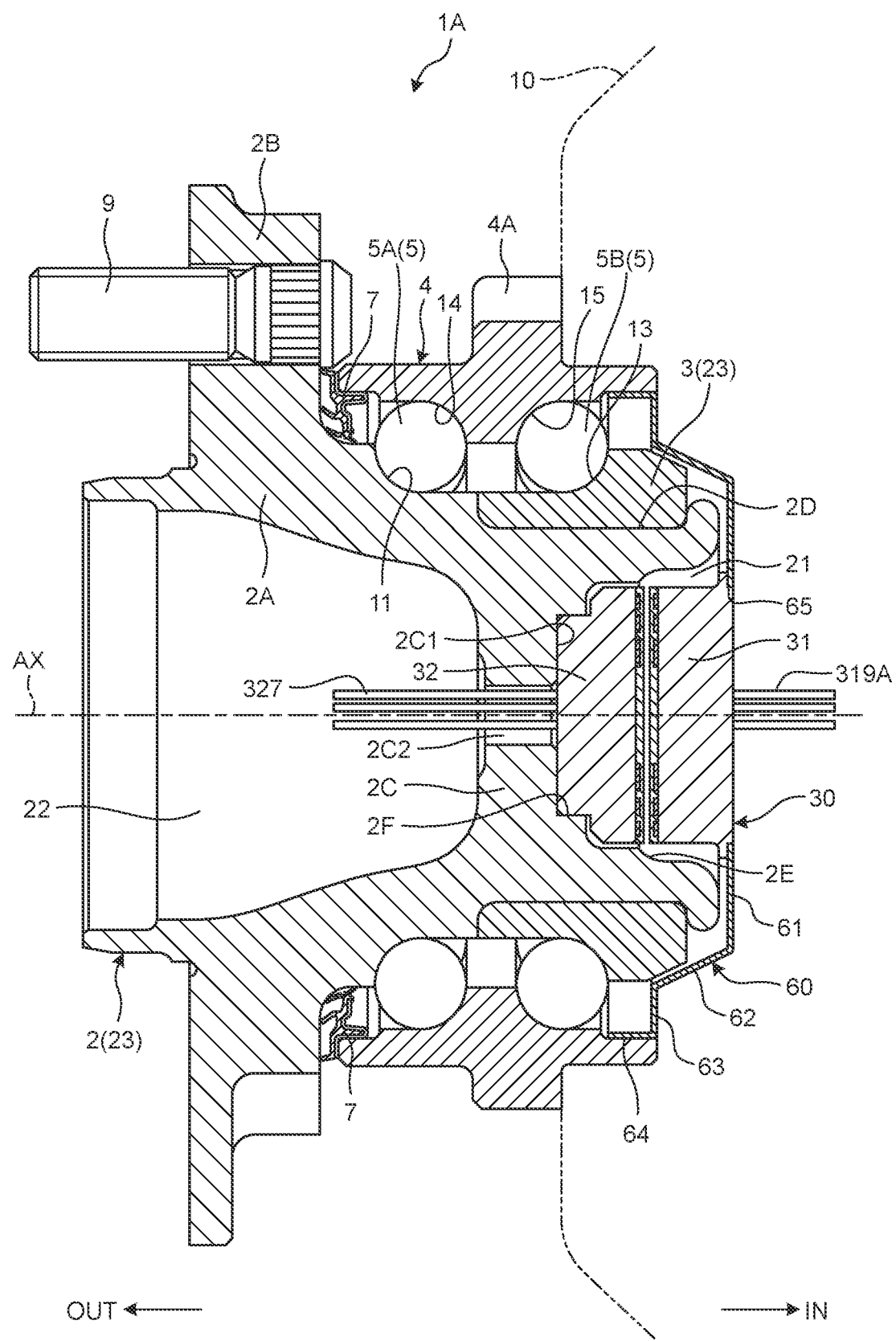
FIG. 5 is a cross-sectional view illustrating a rolling bearing unit according to a modification.

For example, as illustrated in a rolling bearing unit 1A in a modification of FIG. 5, wiring 319A may be directly connected to the stationary-side main body 310. That is, as illustrated in FIG. 1, in the rolling bearing unit 1 according to the embodiment, the connector 319 is integrally joined with the stationary-side main body 310. However, it is not required to integrally join (connect) the connector 319 thereto, and the wiring 319A may be connected from the stationary-side main body 310.

Further, in the embodiment, the stationary-side transmission part 31 is an integrally molded product in which the stationary-side main body 310 and the covering portion 314 are integrally joined to each other, and the stationary-side transmission part 31 and the first cover 60 are integrally joined to each other. However, the stationary-side first electrode 311, the stationary-side second electrode 312, and the stationary-side third electrode 313 may be molded with resin so that the entirety of the stationary-side main body 310, the covering portion 314, and the first cover 60 is integrally molded with the same resin.

1, 1A ROLLING BEARING UNIT
2C PARTITION WALL
2C2 THROUGH HOLE
4 OUTER RING MEMBER
5 ROLLING BODY
21 FIRST RECESS (RECESS)
23 INNER RING MEMBER
30 TRANSMITTER
31 STATIONARY-SIDE TRANSMISSION PART
32 ROTARY-SIDE TRANSMISSION PART
60 FIRST COVER (COVERING MEMBER)
311 STATIONARY-SIDE FIRST ELECTRODE (STATIONARY-SIDE ELECTRODE)
312 STATIONARY-SIDE SECOND ELECTRODE (STATIONARY-SIDE ELECTRODE)
313 STATIONARY-SIDE THIRD ELECTRODE (STATIONARY-SIDE ELECTRODE)
321 ROTARY-SIDE FIRST ELECTRODE (ROTARY-SIDE ELECTRODE)
322 ROTARY-SIDE SECOND ELECTRODE (ROTARY-SIDE ELECTRODE)
323 ROTARY-SIDE THIRD ELECTRODE (ROTARY-SIDE ELECTRODE)
AX ROTATION AXIS

The invention claimed is:

1. A rolling bearing unit comprising:
an inner ring member having a recess on a first side in an axial direction along a rotation axis, the recess being recessed toward a second side in the axial direction;
an outer ring member disposed on an outer peripheral side of the inner ring member;
a rolling body that is rollably provided between the inner ring member and the outer ring member and rotatably supports the inner ring member relative to the outer ring member;
a non-contact transmitter using electric field coupling that is capable of transmitting at least one of an electric power or a signal and includes a stationary-side transmission part including a stationary-side electrode and a rotary-side transmission part including a rotary-side electrode disposed to face the stationary-side electrode at an axial distance therefrom;
a covering member that is supported by the first side of the outer ring member in the axial direction, covers the first side of the inner ring member in the axial direction, and fixes the stationary-side transmission part to the first side in the axial direction; and
the rotary-side transmission part and the stationary-side transmission part are housed inside the recess.

2. The rolling bearing unit according to claim 1, wherein
the rotary-side transmission part is housed inside the recess,
the inner ring member has a partition wall extending inward in a radial direction to serve as a bottom of the recess and provided with a through hole that penetrates in the axial direction, and
the rotary-side transmission part abuts against the partition wall to seal the through hole.

3. The rolling bearing unit according to claim 1, wherein
the stationary-side transmission part is an integrally molded product with the covering member.

* * * * *